(12) United States Patent
Rasmussen

(10) Patent No.: US 8,557,364 B2
(45) Date of Patent: Oct. 15, 2013

(54) FILM MATERIAL EXHIBITING TEXTILE PROPERTIES AND METHOD AND APPARATUS FOR ITS MANUFACTURE

(76) Inventor: Ole-Bendt Rasmussen, Walshwil (CH)

( * ) Notice: Subject to any disclaimer, the term of this patent is extended or adjusted under 35 U.S.C. 154(b) by 213 days.

(21) Appl. No.: 12/863,283

(22) PCT Filed: Jan. 15, 2009

(86) PCT No.: PCT/EP2009/050412
§ 371 (c)(1),
(2), (4) Date: Jul. 16, 2010

(87) PCT Pub. No.: WO2009/090208
PCT Pub. Date: Jul. 23, 2009

(65) Prior Publication Data
US 2010/0297387 A1 Nov. 25, 2010

(30) Foreign Application Priority Data

Jan. 17, 2008 (GB) .................................. 0800828.6
Aug. 5, 2008 (GB) .................................. 0814308.3

(51) Int. Cl.
B32B 5/00 (2006.01)
B32B 38/00 (2006.01)
B29C 55/00 (2006.01)

(52) U.S. Cl.
USPC ........... 428/114; 428/98; 428/105; 428/298.1

(58) Field of Classification Search
USPC ................................. 428/114, 98, 105, 298.1
See application file for complete search history.

Primary Examiner — Brent O'Hern
(74) Attorney, Agent, or Firm — Robert W Strozier

(57) ABSTRACT

A film material formed of thermoplastic polymer material is processed so as to have linearly extending regions (A) linked together by linearly extending webs (B), regions (A) and webs (B) each being oriented, the dominant direction of orientation in regions (A) forming an angle (V) to the direction on which (A) extends and webs (B) comprising arrays of linear furrows of thinner material or splits forming angles (U) higher than (V) to the direction in which (A) extends. The method of producing the new film involves passing an orientated film through a pair of intermeshing grooved rollers to cold-stretch the film in a direction at an angle to the predominant original orientation, at least one of the grooved rollers having crests with sharp edges to form the division between regions A and webs B and to stretch the material to form webs B while stretching the material less or not at all to form regions A. Preferably at least one of the grooved rollers has crests with a waved surface shape.

21 Claims, 13 Drawing Sheets

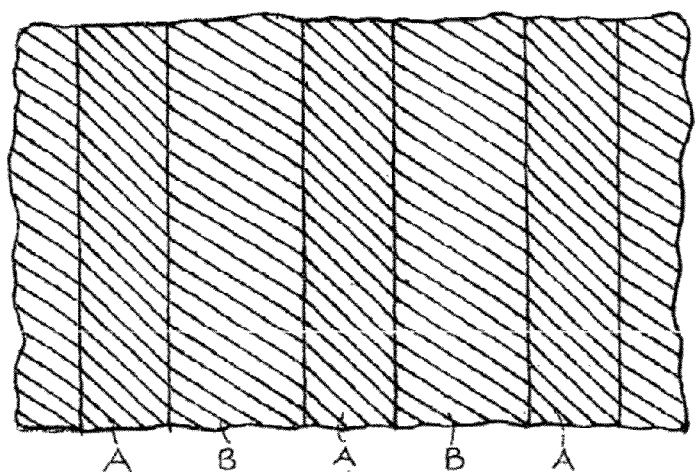
FIG. 2a
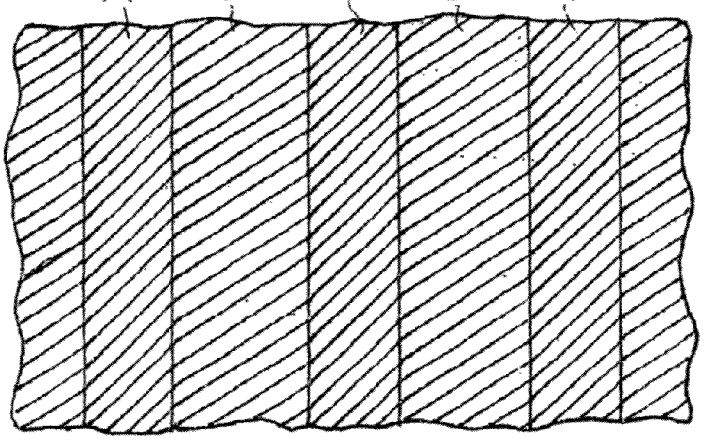
FIG. 2b
FIG. 2c
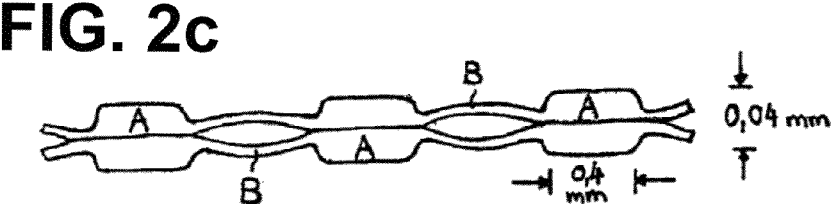

FILM MATERIAL EXHIBITING TEXTILE PROPERTIES AND METHOD AND APPARATUS FOR ITS MANUFACTURE

RELATED APPLICATIONS

This application is a 35 U.S.C §371 nationalization of PCT/EP2009/050412 filed 15 Jan. 2009 claiming priority to GB0800828.6 filed 17 Jan. 2008 and GB0814308.3 filed 5 Aug. 2008.

BACKGROUND OF THE INVENTION

1. Field of the Invention

The object of the invention appears from the title. By textile properties there is primarily meant a soft and warm handle. In particular the invention concerns very low weight film materials, and embodiments of the invention are directed to film material which additionally exhibits through-going porosity and/or high strength such as tear propagation resistance, tensile strength and puncture strength.

2. Description of the Related Art

During the last 40-50 years there have been presented a number of proposals and a few industrial processes for manufacture of film materials formed of thermoplastic polymer material exhibiting textile properties, but due to complications in the manufacturing process and/or relatively high machine costs, these technologies have in general not been competitive with non-woven technologies based on spun filaments. In particular this has been a difficulty for materials with low weight per area. The object of the present invention can be further specified as aiming at relatively low machine costs, and simplicity in the carrying out of the process.

WO 06/072604 and WO 06/120238, both concerning inventions which have been developed in the laboratory of the inventors, disclose stretching of monoaxially oriented film in a direction transverse to the original orientation, by passage between intermeshing grooved rollers on which the crests are generally flat and have sharp edges. There is hereby formed a fine pattern of thicker linear "bosses" and intervening thinner "webs", and due to the sharp edges on the crests of the grooved rollers there is a distinct separation between the two regions in the pattern.

In both inventions this stretching is a step in the manufacture of crosslaminates. In the first mentioned patent the produced pattern of thickness differences serves to form an internal micro-channel system in the crosslaminate, channels which in connection with mutually displaced perforations in the two films form an advantageous type of through-going porosity.

In the second mentioned invention the purpose of the introduction of the fine pattern of "webs" which have become biaxially oriented, is to improve the tear propagation resistance.

As it appears from both of the above-mentioned WO publications, the stretching between the intermeshing grooved rollers with crests having sharp edges is carried out in such a way that the original direction of orientation is parallel or practically parallel with the grooves. However, in trials preceding the present invention the inventors used their grooved-roller machine, designed for the abovementioned two inventions, in a different way, namely to stretch a 20 micron thick coextruded uniaxially melt-oriented HDPE film under an angle of about 45° to the melt orientation and with an engagement between the crests of the grooved rollers which was deeper than tried before. This produced a film of unique structure, namely the structure which appears from the microphoto FIG. 1. This structure gave the film a surprising soft and warm feel. It became 15 clear that such film in itself, or in form of an assembly of several films, is very suited for several textile applications. As it will appear from the following, this film structure and an assembly of such films can be manufactured by an uncomplicated process and using relatively inexpensive and safely working machinery, the key machinery being the grooved rollers with sharp-edged crests and industrially well established, uncomplicated machinery designed to make a uniaxial orientation extend under an acute angle to the continuous direction of a film web.

SUMMARY OF THE INVENTION

The product according to the present invention is a film or an assembly of films, the or each film being formed of thermoplastic polymer material and comprising an array of parallel bandformed, linearly extending regions (A) and distinct therefrom as this expression is specified below linearly extending webs (B) which integrally connect said regions (A), each web (B) being at each location of its linear extension thinner than the adjacent portions of regions (A), and in which film or assembly of films both (A) and (B) are oriented having at each location a dominating direction of orientation, The product is characterised in that in said film or in each film of the assembly the dominating direction of orientation in the regions (A) forms angles (v) higher than zero but no higher than 80° C. with the direction in which (A) extends, and the said webs (B) comprise arrays of linear furrows (C) which either are necking-down zones or are splits, said furrows forming angles (u) higher than (v) to the direction in which (A) extends.

The method of the invention is a method of producing this product by stretching, and starts with a film or an assembly of films each having a predominant direction of orientation. The stretching is carried out by means of a pair of mutually intermeshing first grooved rollers and takes place in a direction which is different, but at the highest 80° different from the predominant original direction of orientation in the said single film or in each of the said assembled films. The method is characterized in that at least one of the grooved rollers in the pair has crests with edges which are sufficiently sharp to form a distinct division as this expression is specified below between parallel, linearly extending webs (B) of film material, which has been coldstretched between the crests of the two first grooved rollers and intervening linearly extending band-shaped regions (A), which have laid on the sharp edged crests and have not been stretched or have been stretched to a smaller extent between the said grooved rollers.

BRIEF DESCRIPTION OF THE DRAWINGS

The invention shall now be described in further detail with reference to the drawings.

FIG. 2a, b and c are sketches of a crosslaminate according to the invention but disregarding the furrows (C). The pleating of regions (A) is considered stretched out. FIG. 2a shows one ply of the laminate, 2b the other ply, the two sides being shown mutually displaced along the direction of the regions (A) and the webs (B). The hatching on FIGS. 2a and b all over indicates the dominating directions of orientation.

FIG. 2c shows a cross-section of the laminate, indicating that the webs (B) are drawn thin and are unbonded, while the regions (A) are mutually bonded together at least in spots or lines or along the boundaries between (A) and (B). Note that in FIG. 2c the thicknesses are shown on a scale which is 10 times the scale on which the widths of the regions (A) and webs (B) are shown.

FIG. 12 which is a microphoto which like FIG. 1, shows a single film according to the invention. In this case the film is produced as described in Example 3 using the roller shown in FIG. 9a.

DETAILED DESCRIPTION OF THE INVENTION

Figure 1:
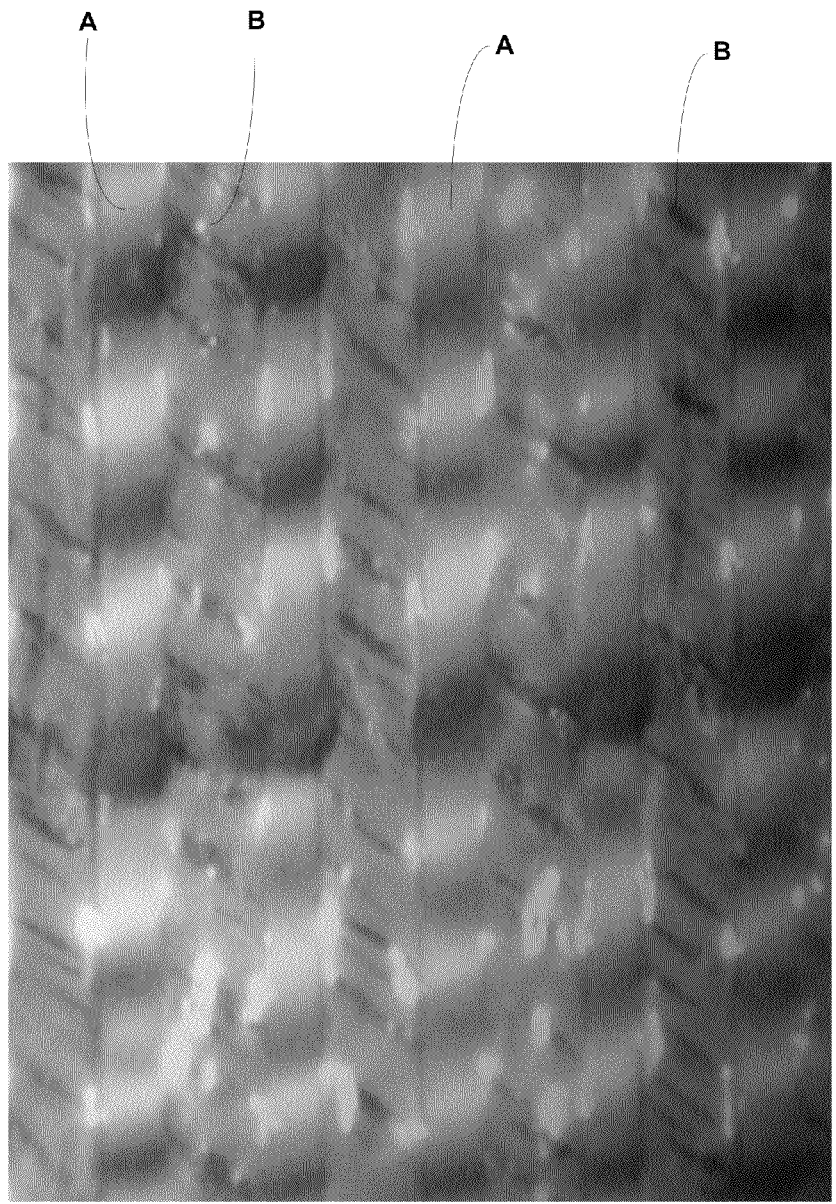
FIG. 1 is a microphoto showing a single film according to the invention. It is the film produced as described in Example 1.

The word coldstretching as used in this specification is meant to comprise any stretching carried out significantly below the melting point of the film, but preferably temperatures below about 60° C. are chosen.

The division between each pair of regions(s) (A) and webs (B) is considered sufficiently distinct, if more than 50% of the thickness change takes place within a zone which is no wider than 15% of the width of the region (A). However, preferably it should be no wider than 10% and more preferably no wider than 5% of this width. This can be examined by microscope.

The thickness change is not necessarily a steady decrease from the higher values in region (A) to the lower values in region (B). Due to the forces concentrated on the material which is in contact with the sharp edges, this change in thickness may be a steady decrease which is followed by a steady increase.

The term "necking-down" is normally used in connection with stretching of polymer films at temperatures essentially below their melting range. It indicates that the stretching process takes place abruptly, such that a section of the film looks like a neck on the shoulders. In the present invention the minimum thickness within the "necking-down" zones should preferably be no higher than 50% of the thickness of the surrounding web (B) material.

It is the combination of the three structural elements, namely the described bandformed regions (A), the traversing furrows (C), and the rest of the interconnecting web (B), which provides the product with a combination of strength properties and textile feel, which is unique for a film product. The furrows (C) which are either ultra-thin regions or regular splits, have particular importance for the flexibility.

Very suitable raw materials for the invention are films which in amounts of at least 50% consist of high density polyethylene (HDPE) or isotactic or syndiotactic polypropylene(PP), preferably of high molecular weight high density polyethylene (HMWHDPE), but other thermoplastic polymer materials are also applicable, including biodegradable polymers.

The grooves on each first grooved roller may be circular or may be helical under an angle no smaller than 85° to the axis of the roller to make the regions (A) and webs (B) extend parallel with the machine direction or under a small angle with the latter. Variations of the circular shape are waved surface forms which shall be described below.

The average gauge of each web (B) is preferably at the highest 70% of the average gauge of the two adjacent regions (A). This can also be examined in microscope. In this connection the demarcation between a region (A) and an adjacent web (B) is considered to be the location where the thickness is the average between the thickest part of said region (A) and the thinnest part of said web (B).

A product comprising a film or a assembly of films, each film comprising a thermoplastic polymer material and further comprising an array of parallel band-shaped, linearly extending regions (A) and distinct linearly extending webs (B) integrally connecting the regions (A), each web (B) being at each location of its linear extension thinner than adjacent portions of the regions (A), and in which the film or assembly of films both the regions (A) and the webs (B) are oriented having at each location a dominating direction of orientation, where the film or each film of the assembly the dominating direction of orientation in the regions (A) forms angles (v) higher than zero but no higher than 80° with the direction in which the regions (A) extend, and the webs (B) comprise arrays of linear furrows (C) which either are necking-down zones or are splits, the furrows forming angles (u) higher than (v) to the directions in which the regions (A) extend. As just disclosed mentioned, it is a precondition that the dominating direction of orientation in the regions (A) forms an angle no higher than 80° with the direction in which (A) extends. It is not possible to indicate a general quantitative lower limit of this angle, since this depends on the polymer material, the orientation in the starting material, the thickness of the film and other parameters. Normally this angle should not be lower than 10°, and normally angles no lower than 20° are preferable, but in some cases good results have been achieved with angles around 5°. However, the choice will be easy for a person skilled in the art after simple experimentation.

Figure 6:
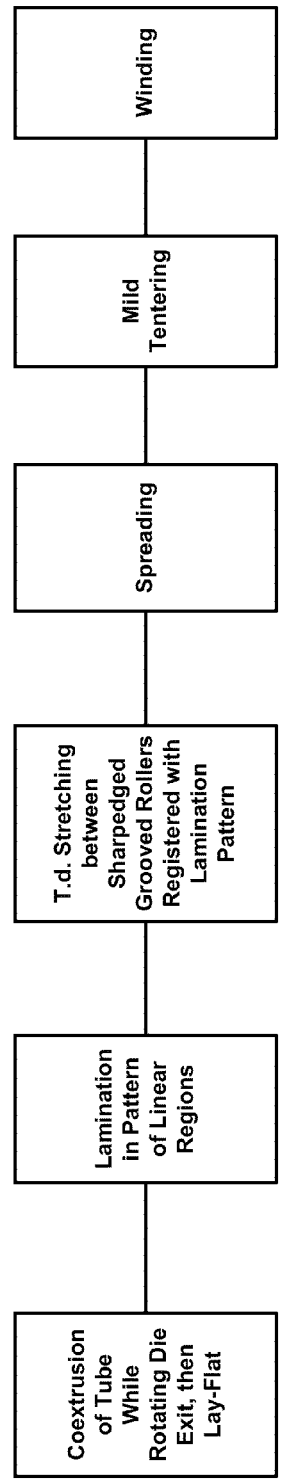
FIG. 6 is a flow-sheet showing a simplified process for manufacture of a crosslaminate, all in line.
Figure 8:
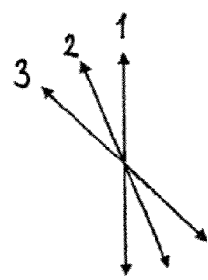
FIG. 8 is a sketch demonstrating angles in a specialty product, between the extension of regions (A)—direction (1)—and the predominant directions of orientation in these regions—directions (2) and (3)—of two cross-laminated films.

The statement that the crests on the first grooved rollers are generally flat implies that they may be slightly curved in section perpendicular to the grooves (i.e. be convex) as long as they are able to produce a distinct separation as specified above, or they may have slightly protruding edge portions, i.e.

be slightly concave as shown in FIG. 6 of WO 06/072604 and in FIG. 8 of WO 06/120238. Such protrusions can serve to make the separation between (A) and (B) particularly distinct.

When the regions (A) and webs (B) are made to become parallel or practically parallel with the machine direction, it means that the original film or films, which become cold-stretched between the intermeshing grooved rollers, must have a predominant direction of orientation forming an angle to the machine direction. This can be achieved by forming the starting film for the method by helical cutting of a tubular film which is oriented mainly in its longitudinal direction. That may be solely by orientation in molten or semi-molten state, or the starting film may additionally have been machine-direction oriented by coldstretching.

The helical cutting can e.g. be carried out as disclosed in U.S. Pat. No. 5,248,366. This well established method is simple, safe and practical. However, if only melt orientation is wanted in the starting film a tubular film can be supplied with a helically extending melt orientation during the haul-off from the extrusion die by rotating the latter relative to the haul-off means. Such method of making biased orientation is also well known.

As mentioned in the introduction, a major purpose of the invention is to provide a film with textile soft and warm handle. To this end the average gauge of the film or of each film in the assembly preferably is no more than 20 g m$^{-2}$, and still more preferably no more than 15 g m$^{-2}$ or even no more than 10 g m$^2$. In this connection it should be mentioned that in practice it will normally not be difficult to separate the films in an assembly and weigh them individually. This shall be further explained below.

Further with a view to the above mentioned primary purpose of the invention, namely achieving a soft and warm handle, it is advantageous that the width of each region (A) is at the highest 2 mm, preferably at the highest 1 mm, and still more preferable at the highest 0.5 mm, while advantageously the division of the array of regions (A) is at the highest 4 mm, preferably at the highest 2 mm, and still more preferably at the highest 1 mm.

For the sake of good order it should be mentioned that GB 1,526,722 and U.S. Pat. No. 5,028,289 disclose processes for manufacture of a crosslaminate, in which tubular films of thermoplastic polymer material, having a predominant longitudinal melt orientation, are helically cut to make the melt orientation extend on bias, then assembled with the melt orientations crossing each other and are transversely stretched together between grooved rollers. However, these grooved rollers are not adapted to produce a distinct separation between zones exhibiting different degrees or directions of orientation. On the contrary, there is aimed at making a relatively smooth crosslaminate, and preferably the transverse stretching between grooved rollers takes place in several steps.

Figure 7:
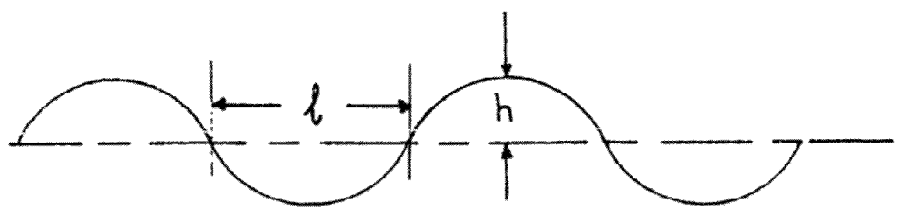
FIG. 7 is a sketch serving as basis for a description regarding the depth of the pleating of the regions (A).

A very important embodiment of the invention is characterised in that the regions (A) are waved, each wave extending over the width of such region, such that each section along the regions (A) extend in a generally sinuous manner, and the webs being shorter than adjacent parts of the regions (A) to stabilize the waving. FIG. 7 shows a preferable minimum height (h) of the waving. The waving acts as a kind of nap to provide a warm feel by means of its heat insolating effect. It also gives the material an aesthetic textile appearance. If micro-flake shaped pigment is dispersed in the polymer material, e.g. made from mineral graphite or on the basis of mica, the material will get a diamond like gloss. A similar effect can be achieved by vacuum coating of the surface of the product, e.g. with aluminum.

This waving occurs spontaneously when the film or assembly of films leaves the intermeshing grooved rollers with the generally flat crests. The reason is that the stretching of the webs introduces a tension which also has a component in the machine direction, thus the webs contract, also along the machine direction, when the tension is released. It is hereby noted that any uniaxial stretching of a thermo-plastic film will introduce a tendency to contraction perpendicular to the direction of stretching. It was found that a preexisting angle of orientation as in the invention enhances such contraction. The regions (A) are practically not subjected to stretching forces since such forces are taken up by the sharp edges and therefore have practically no tendency to contraction after the grooved roller process, but form pleats when the webs contract.

In some applications in which such "nap" effect is not desirable, the waving can be eliminated by stretching in the machine direction at an elevated temperature.

However, the "nap" effect can also be enhanced. For this purpose the degree of the described coldstretching between mutually intermeshing first grooved rollers may be sequentially varied by giving the crests of at least one roller in the pair of grooved rollers a waved surface shape. This is explained in further detail in connection with the drawings.

"Sequential orientation" or "sequential stretching" are well known terms, indicating that the degree of orientation or stretching varies repetitively. This includes the possibility that the orientation or stretching repetitively is zero.

When this "nap" effect is made particularly pronounced by using a relatively deep waving on the surface of one or both intermeshing grooved rollers, the film material in contact with the crests of the waved grooved rollers may locally loose its distinct separation between in the transverse direction practically unstretched regions (A) and more strongly stretched and optionally fibrillated regions (B). Thus, an advantageous product according to the invention, being in the form of a single film or an assembly of films, is characterised in that the linear extending regions (A) form interrupted lines, the regions of interruptions (D) formed of webs thinner than (A) being generally similar to the webs (B) and without any distinct border between the said two web regions, whereby each interrupted linear region (A) including its thinner interruptions (D) is waved, the webs (D) forming the crests of this waving.

As already mentioned, the establishment of the predominant direction of orientation of the starting film can be limited to take place in molten or semi-molten state carried out in the machine direction or helically in connection with the extrusion or it can comprise a coldstretching process in the machine direction. Such coldstretching preceding the helical cutting and preceding the grooved roller stretching can with advantage be a sequential longitudinal stretching preferably between second grooved rollers which have teeth extending parallel to the axis. Preferably the thickness and degree of orientation within each region (A) is thereby brought to vary in sequences no longer than 10 mm, more preferably no longer than 5 mm.

It is known to carry out sequential m.d. stretching between such types of grooved rollers. Since the teeth exert a pressure on the film perpendicularly to the surfaces of the film, it will normally be the film portions which contact the teeth of one or both rollers which receive the highest orientation.

There are several reasons for using such sequential stretching. One reason concerns the tear propagation strength and puncture strength of the product. These properties are normally best when the degree of orientation is low, but on the other hand some coldstretching before the helical cutting may be needed in order to sufficiently bring down the square meter weight. Coldstretching ratios in the range about 1.5-2.0 will often be preferable. However, any attempt to carry out the coldstretching in such low ratios and in continuous manner will normally give a very irregular result with more stretched and less stretched or even unstretched areas randomly between each other, while the sequential stretching in the ratios as mentioned brings order in the variations. The differently stretched portions of the film will thereby form transverse bands.

Additionally, there is a surprising effect by using the sequential stretching, namely an important influence on the creation of waves in the regions (A). When the sequentially stretched tubular film relaxes after the sequential stretching, the bands which have been stretched the most will perform some transverse contraction. This makes the less stretched bands form slacks, which during the step of coldstretching between grooves with sharp-edged crests enhance the formation of waves in region (A). Furthermore, the waving of the regions (A) becomes particularly stable in the spots which are thicker than the rest of the film.

It is well known to make protruding bosses in a film by means of embossment, however by the known embossment these bosses generally become thinner than the surrounding material, and therefore easily loose their protruding shape under a mild pressure. A product of this invention wherein the regions (A) are waved, each wave extending over the width of such region and the webs being shorter than adjacent parts of the regions (A) so as to stabilize the waving, and especially products of this invention: (i) wherein the linear extending regions (A) form interrupted lines, the regions of interruptions (D) formed of webs thinner than the regions (A) being generally similar to the webs (B) and without any distinct border between the said two web regions, whereby each interrupted linear region (A) including its thinner interruptions (D) is waved, the webs (D) forming the crests of this waving; and (ii) wherein the 30 degree of orientation within each region (A) varies in sequences no longer than 10 mm, and preferably no longer than 5 mm, and methods of this invention: (i) wherein the degree of stretching in said coldstretching procedure is sequentially varied by giving the crests of at least one roller in the pair of grooved rollers a waved surface shape, and (ii) wherein the preceding coldstretching is a sequential stretching preferably between second grooved rollers which have axially extending teeth, is better in this respect since the protruding "bosses" here form the thicker portions of the film material, while most of the material which surrounds a "boss" is thinner and provides the desired flexibility of the product.

The film or assembly of films leaving the grooved rollers with sharp-edged crests will be deeply pleated parallel with the regions (A) and the webs (B) and must normally be transversely extended to remove these pleats. This can take place by means of banana rollers or similar simple means. The material may be heat stabilized in this extended form, and a slight tentering may be carried out, preferably while allowing it some contraction in the continuous direction of the regions (A) and webs (B). The tentering devices may be very simple pairs of belts since the forces involved normally are low. The mentioned contraction can e.g. be obtained by giving the film or assembly of films pleats extending perpendicularly to the regions (A) and the webs (B) before it is fed into the tentering devices.

In a second particularly important embodiment of the invention the product is a crosslaminate, as this is more precisely stated in a product of this invention, wherein it is an assembly of films in the form of a crosslaminate, whereby the dominating directions of orientation at each location of the laminate cross each other, the assembled films being joined in spots or lines or both by bonding or blocking or both. Such product normally exhibits, in addition to the textile feel, particularly good tensile properties, tear propagation resistance and puncture strength. The above mentioned advantages of a waved shape of the regions (A) will normally also apply to this embodiment of the invention.

The individual films may become joined in a separate process after the coldstretching of each film between the grooved rollers with sharp-edged crests. Preferably the bulk of each film should be preserved by carrying out the joining as an extrusion lamination process with molten filaments as binder, while keeping a small distance between the laminating rollers.

A simpler method, which generally provides higher tensile strength but less bulk, integrates the laminating with the coldstretching between the sharp-edged crests, by feeding the assembly of films into the stretching nip with their original directions of predominant orientation being in criss-crossing arrangement. After passage of the films through this nip the regions (A) in the different crosslaminated films will exactly cover each other along their full length, and the webs (B) will similarly cover each other. In the crosslaminate manufactured through these steps, the elongation at break is preferably no less than 100% and the ultimate tensile strength no less than 10 MPa, preferably no less than 15 MPa, referring to tensile testing of 2.5 cm wide samples at a velocity corresponding to 500% of the length per minute.

During this coldstretching there may be established a bonding or blocking between the films, localized to the regions (A) and (D) or to boundaries between the webs (B) and the regions (A) or (D), normally under use of films which by coextrusion have been supplied with a suitable lamination layer. Any process for bonding or blocking the films together is preferably limited such that most of each web (B) remains unbonded and unblocked. (The term "blocking" is normally used for a bonding which is so weak that it can be eliminated by peeling without distorting the films).

Figure 5:
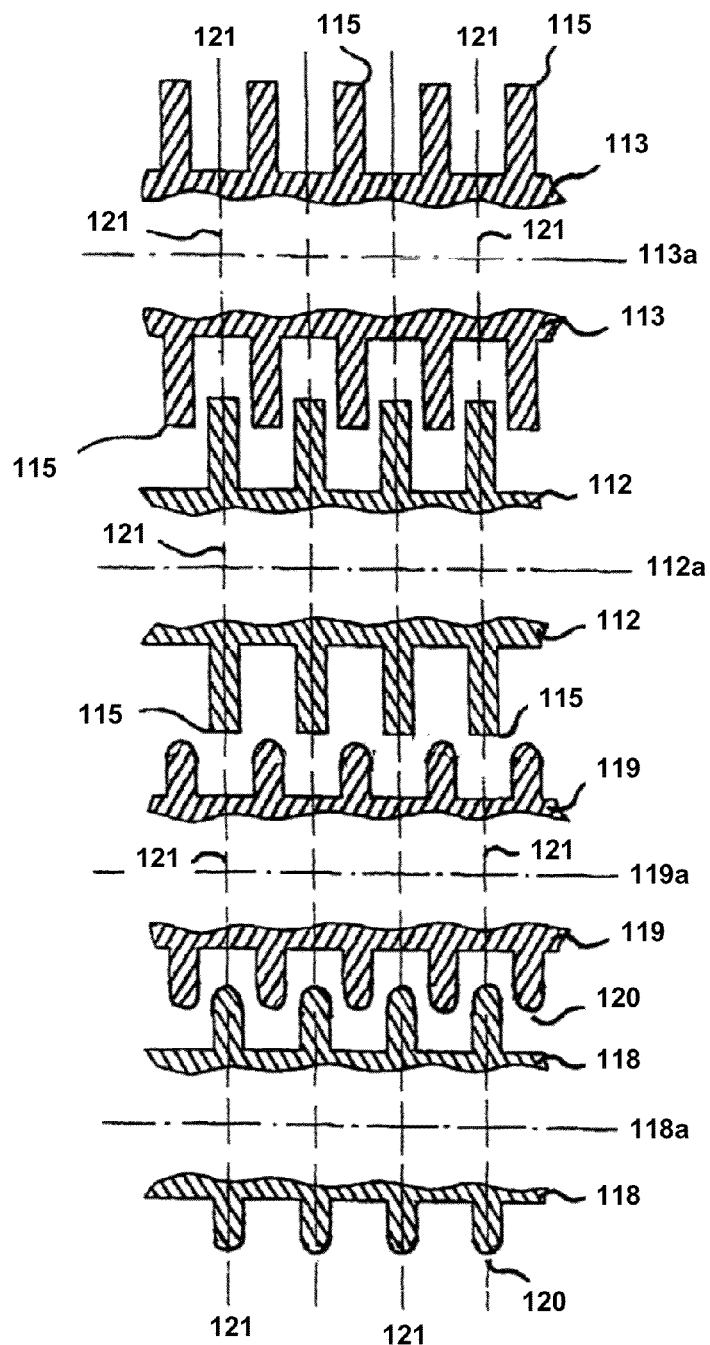
FIG. 5 shows in axial sections the surface parts of a stack of grooved rollers which first bond two or more films together in stripes and then transversely stretch unbonded stripes of the assembly, all grooved rollers being in exact registration with each other at the respective operating temperatures.

It is noted that the tendency to blocking is very pronounced at the boundaries between regions (A) and webs (B), i.e. in the film portions which are drawn against the sharp edges, and when using lamination layers which become slightly sticky at about 60° C., a coldstretching at room temperature between the sharp-edged crests can in many cases provide a blocking which is sufficient for the practical application of the laminate. However, for some applications there will be need for stronger bonding, but still leaving the webs (B) unbonded and maintaining the waving of the regions (A) and (D). This can be established by localized heating of zones within the regions (A) and (D), carried out before or after the stretching between the grooved rollers with sharp-edged crests. Such heating may be carried out with another set of grooved rollers, which are adjusted to be in register with the sharp-edged crests, as this is further explained in connection with FIG. 5.

A special crosslaminate, aiming at particularly good puncture properties, is constructed as stated in a crosslaminate, wherein in the regions (A) the angle between the dominating directions of orientation of any two laminated films is smaller than the sum of the angles which each of these directions form with the direction in which the regions (A) extends. This arrangement is further described in connection with FIG. 8.

In a third particularly important aspect of the invention the webs (B) are in fibrillated or through-going micro-voided state, the fibrillation substantially following the local dominating direction of orientation, while the regions (A) are less fibrillated, preferably essentially unfibrillated and with less (preferably much less) through-going micro-voids. To achieve this structure, the choice of starting film material and the parameters of the coldstretching between the sharp-edged crests may be adapted to produce fibrillation or through-going micro-voiding of the webs while maintaining their coherence and their integral connection with (A), such fibrillation being substantially parallel with the local dominating direction of orientation. Thus the starting material may comprise an additive suitable for producing such fibrillation or through-going micro-voiding.

One embodiment of this method is stated in a method of this invention, wherein the polymer material is a bimodal combination of i) HMWHDPE and ii) HDPE of a much higher melt flow index than the HDPE, e.g. 20 times so high or higher, with an addition of split promoting micro-grains, preferably consisting of chalk or talc, another embodiment in a method characterized in that the polymer material is a blend of HDPE, preferably HMWHDPE, and minor amounts of an extrudable water-soluble polymer of a lower melting point, e.g. polyoxyethylene. Both are further explained below. However, the structure according to the third aspect of the invention can also be established by carrying the stretching between the grooved rollers under conditions which form the webs in a continuous structure but with the furrows (C) in form of parallel "necking-down" zones (see FIG. 1 and description of this). Subsequent to the stretching, but preferably in line herewith, the "necking-down" zones are then disrupted to form real splits. Such disruption can be carried out in different ways, but preferably by passing the product while tentered over a stream of hot air and adapting the conditions of the treatment (air temperature, air velocity, velocity of the film) so that the disruption in general becomes confined to the "necking-down" zones. One advantage of this method of forming splits is that the polymer portions which were broken by heating, have lost the orientation, and thereby help to avoid further splitting.

For the understanding of the methods according to a method of this invention, wherein the polymer material is a bimodal combination of i) HMWHDPE and ii) HDPE of a much higher melt flow index than the HDPE, e.g. 20 times so high or higher, with an addition of split promoting micro-grains, preferably consisting of chalk or talc and a method characterized in that the polymer material is a blend of HDPE, preferably HMWHDPE, and minor amounts of an extrudable water-soluble polymer of a lower melting point, e.g. polyoxyethylene, reference is made to GB Patent No. 1, 148,382 (Rasmussen). This patent deals with the manufacture of extremely fine fibre networks by fibrillation of an oriented film made from a polymer blend. Such fibre networks are made (quoting from the patent) "by colloidally mixing while molten a crystallizable high molecular weight polymeric material A with a polymeric material B, which is chemically different from A and has a lower melting point and a higher melt index than A, extruding the melt mixture as a sheet and phase orientating the sheet by strongly stretching the sheet in the direction of extrusion while the sheet is still molten, cooling the stretched sheet first to make the polymeric material A crystallize and agglomerate while keeping the polymeric material B in fluid state, swelling or partially leaching out the polymeric material B and splitting the sheet material thus formed by stretching it in a direction transverse to the direction of orientation".

(The use of the symbols A and B are of course different from the use of the same symbols in the present claims).

The said patent explains that under such conditions the polymer called B will tend to form thin membranes around "crystal needles" of the polymer called A, although there still will be direct connections between adjacent crystal formations. The patent also mentions polyoxyethylene as a suitable "B" polymer.

In connection with the present invention it is not economically feasible to leach out or swell a component, but the structure described in the old patent, i.e. needle formed crystal formations partly separated by fine membranes, is very suitable for the fibrillation. This is the background for a method of this invention, wherein the polymer material is a bimodal combination of i) HMWHDPE and ii) HDPE of a much higher melt flow index than the HDPE, e.g. 20 times so high or higher, with an addition of split promoting micro-grains, preferably consisting of chalk or talc and a method characterized in that the polymer material is a blend of HDPE, preferably HMWHDPE, and minor amounts of an extrudable water-soluble polymer of a lower melting point, e.g. polyoxyethylene.

As regards a method of this invention, wherein the polymer material is a bimodal combination of i) HMWHDPE and ii) HDPE of a much higher melt flow index than the HDPE, e.g.20 times so high or higher, with an addition of split promoting micro-grains, preferably consisting of chalk or talc, it is noted that, although the mentioned two polyethylenes chemically seen are almost identical, the big differences in their molecular weights cause the HMWHDPE to form the described "crystal needles" and the other HDPE to form more fragile "membranes" between these needles. This promotes the splitability while still maintaining a suitably high strength in the product.

The method of a method characterized in that the polymer material is a blend of HDPE, preferably HMWHDPE, and minor amounts of an extrudable water-soluble polymer of a lower melting point, e.g. polyoxyethylene, is in particular meant for manufacture of diapers, namely for the web in direct contact with the skin. The urine will partly dissolve the water-soluble polymer, which by the splitting has become exposed at the split surfaces. Thereby it will act lubricating on the skin. There may be added an aseptic agent to this water-soluble polymer.

For most but not all applications, this third aspect of the invention, i.e. the fibrillation or the formation of through-going voids, is preferably carried out in conjunction with the first embodiment, i.e. the waving of regions (A) (and (C) when present), and/or with the second embodiment, i.e. the crosslamination.

The film or film assembly made according to the invention can be very suitable for manufacture of bags with special properties and in the manufacture of several types of sanitary products. As an example, the film or assembly of films in essentially non-fibrillated form and without through-going voids is very suitable for garbage bags.

As described above, the coldstretching by use of a relatively deep waving on one or both intermeshing grooved rollers may make the regions (A) interrupted lines instead of continuous lines. In order to achieve a particularly high bulk and/or degree of fibrillation or though-going porosity, but to some extent at the expense of strength properties, this effect may be taken so far that the regions (A) lose the character of being linear and become a multitude of "dots" arranged in linear arrays.

The invention also comprises any new apparatus which is suitable for carrying out the described method steps.

Figure 3:
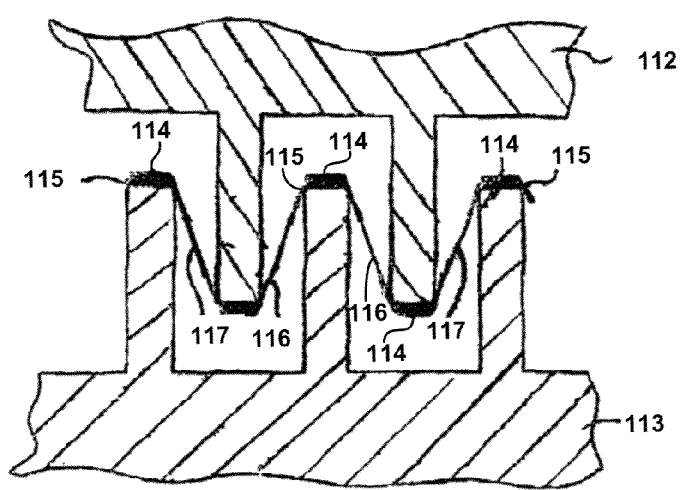
FIG. 3 shows an axial section of the surface parts of two grooved rollers having circular crests with sharp edges, which intermesh and stretch a film or an assembly of films.
Figure 4:
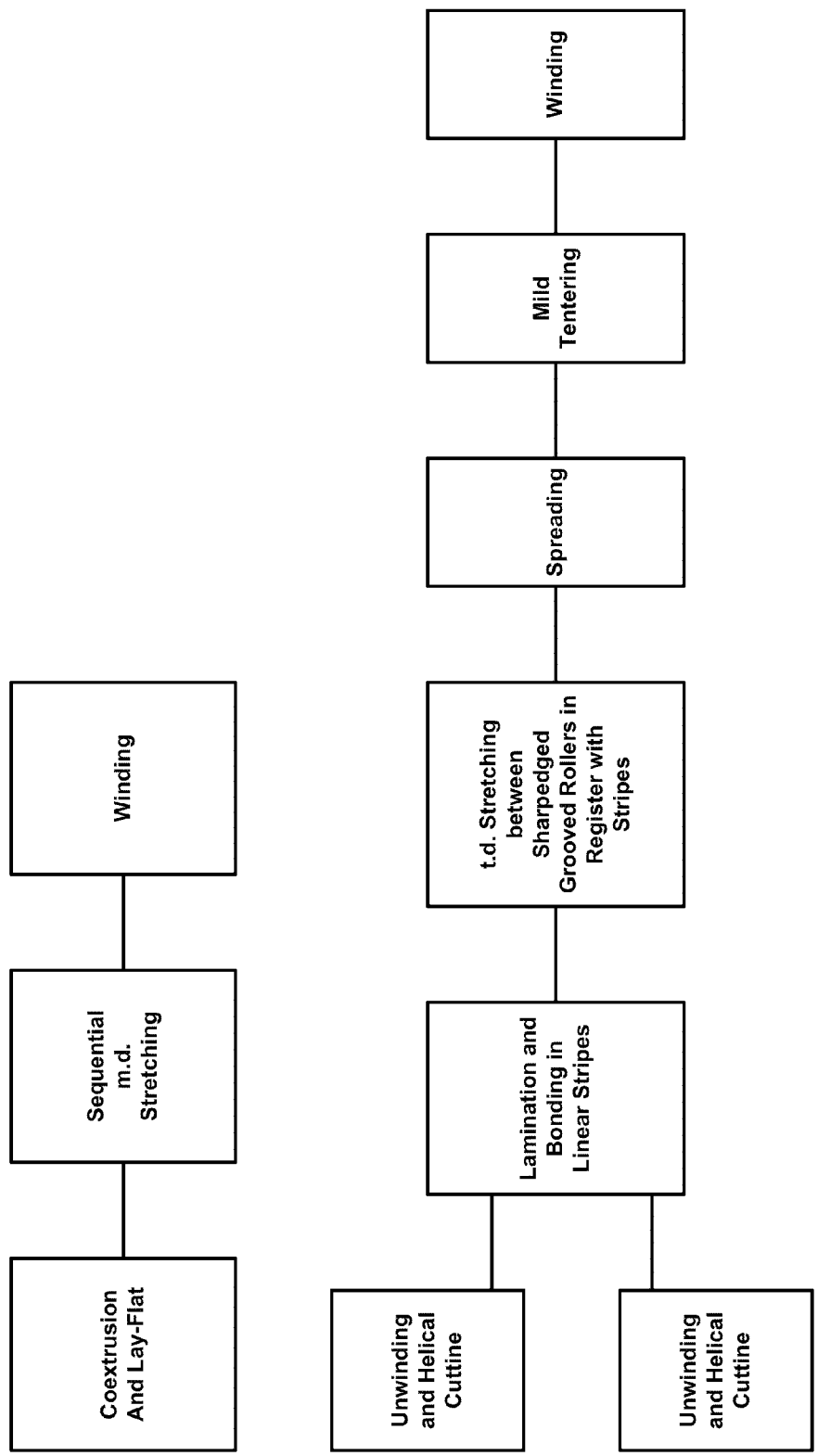
FIG. 4 is two flow sheets representing two lines which together produce a crosslaminate according to the invention. The two steps "Lamination and bonding in linear stripes" and "t.d. stretching between sharp-edged grooved rollers in register with stripes" are carried out by the apparatus shown in FIG. 5.

FIGS. 2a, b and c, FIG. 4 and FIG. 6 require no further explanation. The microphoto FIG. 1 shows the single film made as explained in Example 1 and demonstrates the linearly extending regions (A), which are waved with each wave extending over the width of such region, and the webs (B), which have been drawn thinner between sharp-edged crests on the intermeshing grooved roller shown in FIG. 3. The webs (B) comprises the ultra thin "necking-down" zones (C). As the photo demonstrates there is a distinct separation between (A) and (B). It is noted that the polymer material has been pigmented white and the background is black.

To emphasize the waving, the photo is taken with a beam of light projected on the sample almost parallel with the direction in which (A) and (B) extends. Measurements on microphotos of samples from the same film material but taken under other angles show that the ratio (I/h) between a half wave length (I) and the height (h) of a single wave generally is about 4:1. The sketch FIG. 7 is drawn in order to avoid any misunderstanding of what half wavelength (I) and waveheight (h) here mean. For comparison, the ratio (I/h) in FIG. 7 is 3:1. It is considered that a ratio as high as about 8:1 also will provide a thin film according to the invention with a warm feel.

While the predominant direction of orientation in the regions (A) form an angle of 45° with the extension of these regions—this appears from the manufacturing process described in Example 1—the black biased lines in the microphoto show how the stretching between the sharp-edged crests has turned this angle larger in the webs (B). These lines appear as being splits, but attempts to transmit air through gave negative result, showing that they are extremely thin film portions, or in other words "necking-down" zones. They contribute especially to the flexibility of the film, and they also occur when two films are stretched together to form a crosslaminate according to the invention.

On the other hand, these split-like lines also show that it will be easy, by modifications of the raw material composition and/or of the parameters of the process conditions, and/or by a subsequent disruptive process to form real splits and/or through-going micro-voids. This can e.g. be established by basing the composition on polymer grades which are less split-resistant than the HMWHDPE used in Example 1, and/or by admixture of split-inducing particles. In this connection, the concentration of such particles can be and ought to be much lower than normally used when producing through-going micro-voids during stretching.

In the foregoing general description there are mentioned preferable limits for the average gauge of each web (B), expressed as a percentage of the average gauge of the adjacent regions (A). If the webs (B) have been supplied with splits, the split micro-areas must hereby be included in the calculation of average, contributing with gauge zero.

As mentioned above the microphoto shows a single film made as described in Example 1. This Example also describes a trial production of a 2-ply crosslaminate on basis of the same starting film. Microphotos of this crosslaminate looks the same as FIG. 1, except that the pictures of the webs (B) show criss-crossing lines appearing like splits, but in reality being ultra thin stretching lines in the two films.

FIGS. 2a, b and c show how two films in a crosslaminate according to the invention can have regions (A) which entirely cover each other, and thinner webs (B) which also entirely cover each other. It has already been mentioned that the furrows (C) are disregarded in these drawings. As shown in FIG. 2c the webs (B) are not bonded or blocked together, while the regions (A) at least are blocked together. This is normally established through lamination layers (not shown in the sketch). As mentioned in the general description the tendency to blocking is high at the boundaries between (A) and (B). This is because the two films are strongly pulled together on the sharp edges of the crests of the grooved rollers. However, preferably the main portions of the regions (A) should be regularly bonded together, as this is described in connection with FIG. 5.

As the hatching of FIGS. 2a and 2b indicate, the directions of orientation criss-cross all over. The angles which the orientation of the two films within the regions (A) form with the direction in which these regions extend (that is normally but not always the machine direction) is here shown as plus and minus 45°, but in practice it can be any angle from about ±5° to ±80°.

However, there needs not be symmetry as here shown, and the orientations in the two films may even be one-sided, seen in relation to the direction in which the regions (A) and the webs (B) extend. This is shown in FIG. 8, where (1) is the direction in which (A) and (B) extend, (2) is the predominant direction of orientation of one film in the crosslaminate, and (3) the predominant direction of orientation in the other ply. In both cases these orientations refer the regions (A). In a crosslaminate, wherein in the regions (A) the angle between the dominating directions of orientation of any two laminated films is smaller than the sum of the angles which each of these directions form with the direction in which the regions (A) extends, this arrangement of orientation is expressed more exact. The purpose of this very asymmetric arrangement is to give the crosslaminate particular good puncture resistance, however at the expense of some other strength properties.

With reference to FIG. 3, the mutually intermeshing grooved rollers (112) and (113) which effect the segmental transverse stretching of webs (B) have flat crests (114) on their circular teeth with sharp edges (115). (Flat seen in axial section, in section perpendicular to the axis they are circular). This causes the stretching to be limited to these webs, here numbered (111). The portions of the film material which lay on the flat crest (114) form the practically unstretched regions (A). In order to fully avoid stretching of these regions the grooved rollers are preferably kept at a low temperature, e.g. 15 to 20° C., while the rest of the film may be treated with warm air e.g. of temperature about 40° C. The requirements for precision in the manufacture of the roller surfaces are high, and it is highly advisable to make the outer part of rollers from short segments.

As mentioned in the general description, on one of the rollers 112 or 113 the crests may have rounded edges or may be rounded all over, so that the transverse stretching and the formation of the thin "necking-down" zones or of splits also take place on these crests. This means that the webs (B) will become wider than the regions (A). Certain strength values may hereby become enhanced, while the textile appearance becomes somewhat less pronounced.

When the crest on one roller (112) or (113) are rounded or have rounded crests, that roller should preferably be heated, e.g. to a temperature between about 15-20° C. The process may conveniently take place in an ambience of about 40° C. air temperature. The film is first preheated by this ambience, then it enters the relatively cold roller to cool the regions (A), and finally the film is transversely stretched in the nip between the two rollers. This stretching comprises the warm film portions.

The process steps, which in one of the flow-sheets in FIG. 4 are called "lamination and bonding in linear stripes" and "t.d. (transverse direction) stretching between sharp-edged grooved rollers in register with stripes" are carried out with the machine shown in FIG. 5. The first mentioned step is carried out with rollers (118) and (119) which have axes (118a) and (119a). These rollers are heated, e.g. to about 90° C. to establish bonding between lamination layers on the films. To achieve even temperature in the different linear stripes to be laminated, there may be a third grooved heating roller upstream of roller (118) but this is not shown. The bonding is established in the nip between the slightly intermeshing grooved rollers (118) and (119). The crests (120) on these rollers are rounded. There must be some intermeshing between the grooved rollers to achieve bonding, but preferably this intermeshing is minimized in order to minimize any stretching at this step.

The stretching which produce the webs (B) takes place between the rollers (112) and (113) with axes (112*a*) and (113*a*). These rollers are constructed like (112) and (113) in FIG. 3, having crests with sharp edges (115). They are preferably kept at about room temperature by circulating water.

To avoid bonding between the two films within the webs (B), all grooved rollers in this stack must be in exact register as indicated by the dot-and-dash lines (121). This registration refers to the operating conditions at which the rollers have different temperatures. The pitch of the grooves, when they are manufactured, must be accordingly calculated. (A 1 m long steel roller expands about 0.11 mm with 10° C. increase in temperature).

It is possible to reverse the route which the film is taken through this stack of rollers, such that the stretching between the sharp-edged crests takes place prior to the lamination on hot rounded grooved rollers. When such route is used, there must be a deep intermeshing between the rounded crests on the rollers (118) and (119).

Furthermore, still referring to the reversed route, roller (118) may be substituted by a nip roller, coated with soft rubber and preferably heated. In this case, only every other region (A) will become bonded in the nip. If one of the preceding grooved rollers has a waved surface shape as shown on FIG. 9*a* or FIG. 9*b*, while the matching grooved roller is truly circular, it must be the latter which forms the nip together with the rubber roller. This nip also produces a slight U-shape of the A-regions which pass the nips, thereby improving the stiffness in one direction.

FIG. 7 has already been described in connection with the description of FIG. 1.

FIG. 8 has already been described in connection with the description of FIGS. 2*a* and *b*.

Figure 9A:
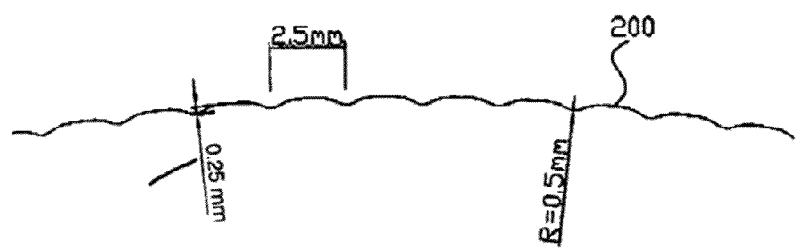
FIGS. 9a and b are cross-sections representing modifications of the surface shape of the crests of the grooved rollers described in connection with FIG. 3.

FIG. 9*a* shows the surface waving of one of the sharp-edged grooved rollers used in Example 3. The sharp-edged grooved roller with which it intermeshes has a circular surface without any waving. As shown in the sketch the shape of the waving is generally sinusoidal, but with a radius of curvature greatest where the distance from the roller axis is largest (in fact the radius of curvature used in example 3 is 68 mm, equal to the roller radius) and smallest (0.5 mm) where this distance is shortest. Depending on the desired film structure, it can also be the other way, or the two mentioned radii may be equal. In this system the stretching/embossing between the grooved rollers will form elongated "pockets" which mainly protrude from one surface of the film or assembly of films.

Alternatively, both grooved rollers may be supplied with a sinusoidal surface shape and assembled such that the regions (200) of biggest diameter on one roller match with the regions of biggest diameters on the other roller. In this case each "pocket" which protrude from one surface will have two neighbours protruding from the opposite surface. In order to avoid overstretching of the film, the waving roller surfaces in this system should generally be shallower than the waving which is preferable in the system described above.

Figure 9B:
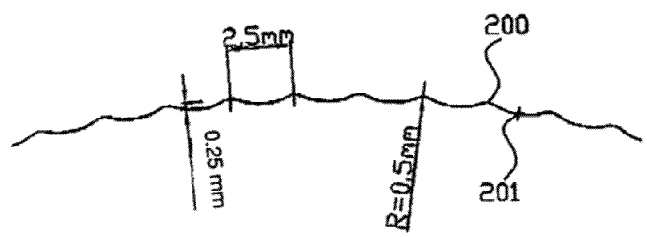

The making of "pockets" on both surfaces can also be effected with a pair of rollers each shaped as shown in FIG. 9*b*. The two rollers must be mutually adjusted so that the positions (200) of greatest distance from the roller axis on one roller corresponds with the middle (201) between neighbours of similar positions (200) on the other roller.

The type of roller illustrated in FIG. 9*b* can also work together with a roller having circular surface without any waving. In this way there can be produced relatively short bosses in the film. Right on the "tip" of each wave on the roller, the edges may be rounded (see below) to promote fibrillation of the tips on the bosses of the film. These tips may even be completely perforated.

Figures 10A, 10B:
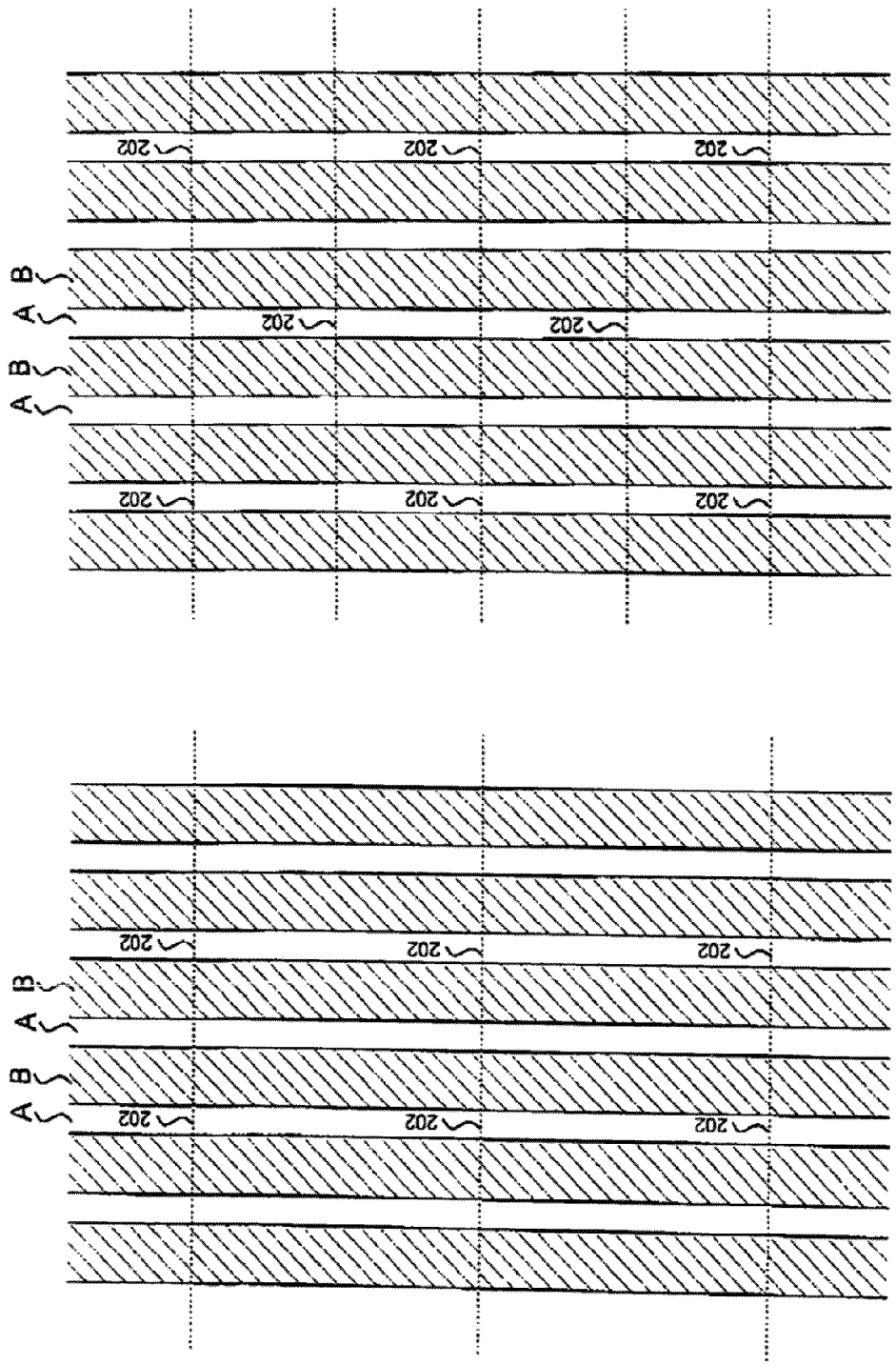
FIGS. 10a and b are sketches illustrating two different patterns of waving, which can be obtained with the roller shapes shown in FIGS. 9a and b.

In FIG. 10*a* and *b* one of the grooved rollers has had waved surfaces, the other one cylindrical surface, like in FIG. 9*a*. The peaks of the linear regions (A) formed by the waved surfaces are marked (202). In FIG. 10*a* each peak in one region (A) is directly adjacent to a peak in each of the two adjacent regions (A), formed by the roller with waved surfaces. This makes the product look as if it were woven and enhances the softness.

In FIG. 10*b* it is opposite. Each peak in one region (A) lays midway between the two closest peaks in each of the two adjacent regions (A) formed by the roller with waved surfaces. This serves to provide some stiffness to the structure, which in some cases is preferable, e.g. for films used to make bags.

In all cases the grooves in the rollers may be formed by turning, while the waved surfaces and the sharp edges best are produced by spark erosion. To make the sharp edges abrasion resistant, a steel with high content of carbon is preferably chosen. This will become particularly hard by the spark erosion process.

If it is desired for the tips on the waved crests to be rounded, this can be done after the spark erosion by means of electrolytic polishing.

Figure 11:
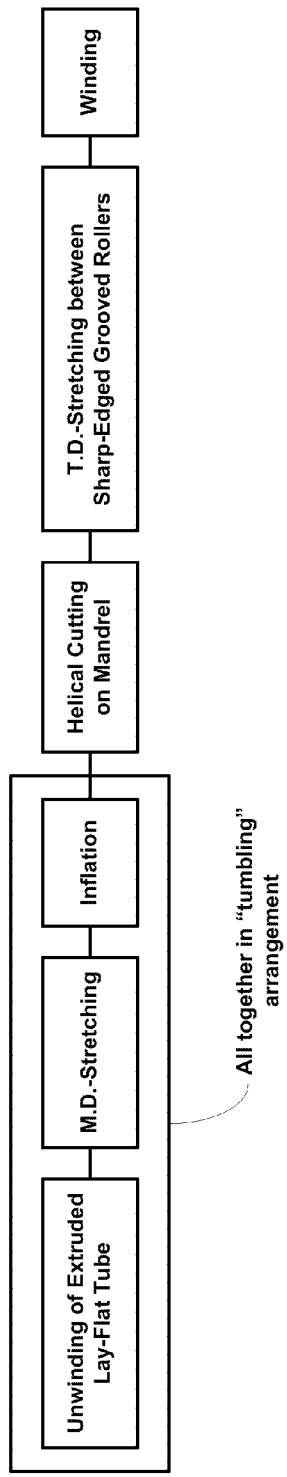
FIG. 11 is a flow-sheet showing particularly practical combination of manufacturing steps.

For a correct understanding of FIG. 11, reference is made to U.S. Pat. No. 5,248,366 (Rasmussen) FIGS. 1, 2 and 3 and related descriptions. These drawings show helical cutting of a tube, which before the illustrated processes has been supplied in lay-flat form with a main direction of orientation parallel with its longitudinal direction. In FIG. 1 of U.S. Pat. No. 5,248,366, the unwinding reel (9), take-off rollers (11) and conveyor belts (17), are assembled in a frame (5) and (6) which performs a "tumbling" movement, i.e. the axes of reel (9), or rollers (11) and of the rollers supporting and driving the conveyor belts (17), are rotated around the axis (23). This is perpendicular to the above-mentioned roller axes and generally goes through the middle of the advancing lay-flat film (10). The latter is inflated and carried over a fixed mandrel (14) in a screwing movement, the inflation being helped by air, introduced by fan (13) to blow through the mandrel (14). The screwing movement is controlled by the circumferential velocity of rollers (11) and the revolutions of the "tumbling". While the inflated film (10) passes over the mandrel (14), it is lubricated by the air stream and remains in stable tubular form until it is helically cut by means of a fixed knife (18) and taken up by a winding system (20), (21), (22).

Now with reference to FIG. 11 of the present specification, the new feature of the "tumbling" arrangement is that the take-off rollers (11) are substituted by or supplemented with a pair or series of machine direction (m.d.) stretching rollers. This may simply be a set of gear rollers as described above. After helical cutting on the mandrel, the biased oriented film may go directly to the t.d. stretching/embossing between the sharp-edged grooved rollers, or it may first or simultaneously be "sandwiched" with a similarly and simultaneously made, biased oriented film, especially so that the orientations of the two films cross each other.

Reverting to U.S. Pat. No. 5,248,366, FIGS. 2 and 3 show a modification of the method and apparatus of FIG. 1 of that specification. In this modification, the axis of the unwinding reel (9) coincides with the axis (23) around which the "tumbling" takes place. There are guiding means (28), (29) and (30) (see FIG. 3) arranged such that the advancement of film 11, which at zone (31) starts perpendicular to the axis of "tumbling" (23), is turned by folding to become parallel with this axis (23). This way of carrying out the "tumbling" unwinding can also be applied as the first step shown in FIG. 10 of the present specification.

The addition of m.d. stretching rollers in a "tumbling" unwinding apparatus for the tubular film, followed by helical cutting while the tube passes over a mandrel in a screwing movement, is considered an invention in itself, independent of its use for manufacture of the textile like film products, which is the primary objective of this specification. In this connection the m.d. stretching method is not limited to the use of gear rollers, but can in principle be any m.d. stretching method carried out by rollers. Furthermore, the change of film form from the lay-flat to tube does not necessarily require inflation by air (13) and conveyor belts (17). These features are preferable, but alternatives can be chosen.

Figure 13:
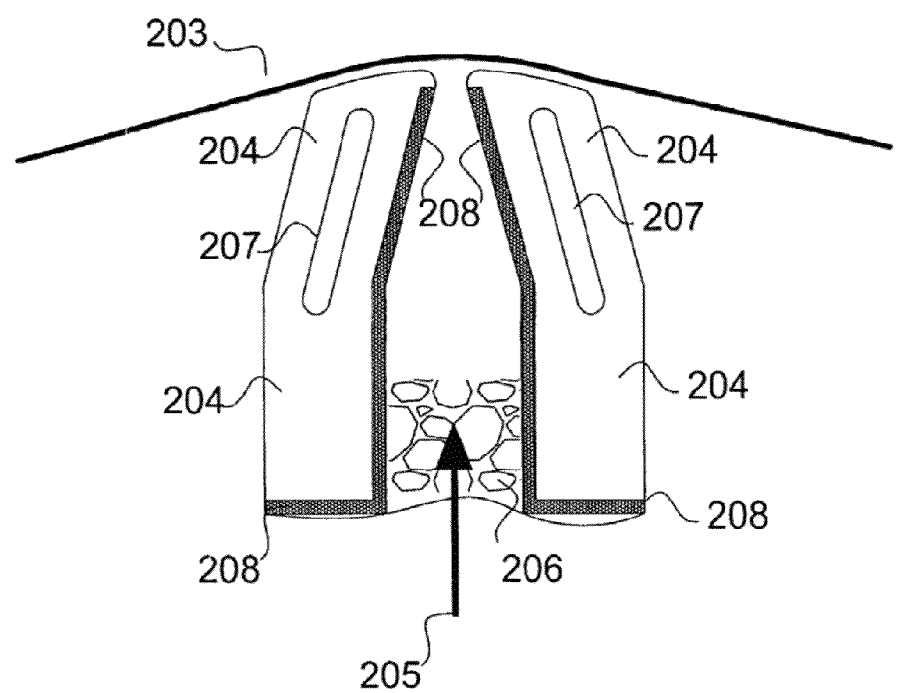
FIG. 13 is a sketch which illustrates a process of developing the furrows (C) from being "necking-down zones" to become open splits. The sketch is drawn parallel with the machine direction.
Figure 14:
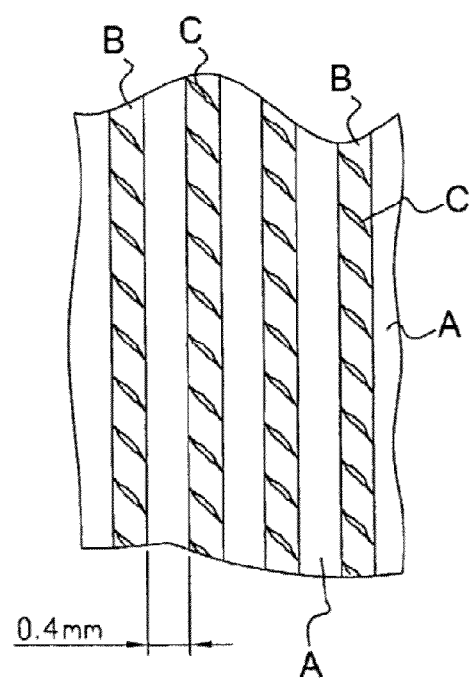
FIG. 14 is a schematic representation of the film structure according to the invention, corresponding to the realistic representation in the microphoto FIG. 1. The meaning of the reference letters (A), (B) and (C) appears from the description of FIG. 1.

With reference to the sketch FIG. 13, it should be understood that the film (203) while entering the device for heat treatment has the structure which appears from the microphoto FIG. 1. As mentioned in the description of this microphoto, the black lines which transverse the webs (B) under an acute angle with the linear regions (A) and which look like splits, are not really splits, but are extremely thin "necking-down" zones. The purpose of the heat treatment shown in FIG. 13 is to disrupt these highly stretched, extremely thin "lines" so that at least a part of these "lines" become transformed into real splits by melting or semi-melting, but without disrupting the webs (B) so seriously that the connections between the linear regions (A) become ruined.

The film (203) is dragged over a slot extending perpendicularly to the plane of viewing, the slot being formed by the metal walls (204) while hot gas, normally air, is blown through the slot as indicated by the arrow (205). At the inlet to the slot there is a system of channels (not shown) to distribute the hot gas evenly over the length of the slot, and a perfect equalization of gas velocity and gas temperatures is further achieved by a packing of ceramic pebbles (206).

The film (203) passes over the slot in tentered state and in contact with the walls (204). The latter are cooled by a cooling fluid which is circulated through the channels (207). Insulating plates (208) prevent cooling of the stream of gas.

During the process, the velocity of the film (203) is kept constant and the temperature and velocity of the gas is very exactly adjusted by experimentation so as to achieve the desired disruption of the "lines" without undesirable further disruptions.

To the knowledge of the inventor it is new to form small holes or small splits in an oriented or unoriented film, by first making the small areas in the film thin by stretching, and then disrupting these small areas by use of hot gas, while the contact time, velocity and temperature of the gas are adjusted to each other. This method is in itself considered an invention independent of its use in connection with the structure which is defined in a product comprising a film or a assembly of films, the or each film being formed of comprising a thermoplastic polymer material and further comprising an array of parallel band-shaped, linearly extending regions (A) and distinct there from as this expression is specified in the description linearly extending webs (B) integrally connecting said the regions (A), each web (B) being at each location of its linear extension thinner than adjacent portions of the regions (A), and in which the film or assembly of films both the regions (A) and the webs (B) are oriented having at each location a dominating direction of orientation, characterised in that in said where the film or in each film of the assembly the dominating direction of orientation in the regions (A) forms angles (v) higher than zero but no higher than 80° with the direction in which the regions (A) extends, and the said webs (B) comprise arrays of linear furrows (C) which either are necking-down zones or are splits, said the furrows forming angles (u) higher than (v) to the directions in which the regions (A) extends.

EXAMPLE 1

A tubular film of average gauge 18.6 micron (measured as 17.9 g/m$^2$) is coextruded having the following composition:

Middle layer, 65% of total: all HMWHDPE except for additives and white masterbatch.

Outer surface layer, 15% of total: 70% LLDPE of m.f.i.=1.0+30% metalocene PE melting between 50-60° C.

Inner surface layer, 100% LLDPE

The blow up ratio is 2.7:1 and the gap of the circular die orifice is 1.0 mm. This means that the tubular film, while getting its thickness reduced by a factor of about 50, gets a strong predominantly longitudinal melt orientation.

This tubular film is helically cut to form a web with 45° orientation. Two such webs are assembled on a 40° C. warm roller with their directions of orientation crossing each other. In line herewith the assembly is transversely stretched between the grooved rollers shown in FIG. 3. The roller temperature is maintained at 20° C. by means of circulating water. The width of each flat crest is 0.4 mm and the pitch of the grooves on each roller is 1.2 mm. This leaves a 0.2 mm space between each set of intermeshing crests. The depth of intermeshing is 1.00 mm, which is the deepest that can be obtained with the available grooved rollers. The average t.d. stretching ratio after a spontaneous shrinkage becomes 1.65:1.

The film is examined for bonding, and it turns out that there is a strong blocking between the two films at the boundaries between the transversely stretched and unstretched portions of the films.

Some of the helically cut film is similarly t.d. stretched as single film. The structure obtained hereby—and similar for each of the films in the crosslaminate—is described in connection with the microphoto FIG. 1.

The produced crosslaminate is tested as it is described after Example 2.

EXAMPLE 2

There is used the same extruded film, the same helical cutting under 45°, and the same crosslamination and transverse stretching I laminating process as in Example 1, but before helical cutting the lay-flat tubular film is m.d. stretched in sequential manner between grooved rollers which have teeth extending parallel to the axis. The crests of these teeth are semicircular with diameter 1.9 mm, and the pitch of the grooves on each roller is 5.0 mm. By the applied inlet and outlet tension in the film and the intermeshing between the rollers the average stretching ratio is adapted to be 1.4:1. The stretching takes place on the rounded teeth on one of the grooved rollers and between the teeth, while film on the teeth of the other roller remains unstretched.

The testing of the produced crosslaminate is recorded below.

Comparative Testing of Example 1 and Example 2 Film

The two crosslaminates and the extruded tubular film are tensile tested and tested for puncture strength against penetration of a "horn" of diameter 10 mm having semi spherical tip.

The tensile testing is carried out on 25 mm wide specimens cut at 45° or in m.d. or t.d. using a velocity corresponding to 500% elongation per minute. Yield force, ultimate tensile strength and elongation at break are determined from strainl-stress diagrams. The aim has been to produce a film which in all direction exhibits high ultimate tensile tension in combination with a high elongation at break.

The puncture resistance test is carried out by tightly buckling the film material between two rings, each having in their middle a circular opening of diameter 35 mm. The "horn" is centred in relation to this opening and is penetrated into the film material with a velocity of 5 mm per second till the film breaks. There is aimed at a high force at break as well as a deep penetration. The force at break is converted from Newton to MPa by dividing with an area which is the thickness multiplied with the circumference of the horn, both in mm.

The results of the comparative testing appear from the following tables.

a) Horn Puncture Tests

Extruded Film, No Further Treatments, Gauge 17.9 g/m$^2$

| Test | Penetration (mm) | Ultimate Puncture Strength | |
|---|---|---|---|
| | | N | MPa |
| Test 1 | 26 | 16.00 | 26.79 |
| Test 2 | 33 | 19.00 | 31.82 |
| Test 3 | 28 | 15.40 | 25.79 |
| Test 4 | 33 | 20.40 | 34.16 |
| Test 5 | 33 | 20.00 | 33.49 |
| Average | 30.6 | 18.16 | 30.41 |

Example 1, Gauge 22 g/m$^2$

| Test | Penetration(mm) | Ultimate Puncture Strength | |
|---|---|---|---|
| | | N | MPa |
| Test 1 | 26 | 28.50 | 38.69 |
| Test 2 | 25 | 24.50 | 33.26 |
| Test 3 | 23 | 27.00 | 36.66 |
| Test 4 | 26 | 24.50 | 33.26 |
| Test 5 | 24 | 28.00 | 38.01 |
| Average | 24.8 | 26.5 | 35.98 |

Example 2, Gauge 19 g/m$^2$

| Test | Penetration (mm) | Ultimate Puncture Strength | |
|---|---|---|---|
| | | N | MPa |
| Test 1 | 20 | 26.75 | 42.11 |
| Test 2 | 23 | 32.50 | 51.16 |
| Test 3 | 24 | 33.75 | 53.13 |
| Test 4 | 23 | 32.00 | 50.37 |
| Test 5 | 22 | 34.00 | 53.52 |
| Average | 22.4 | 31.8 | 50.06 | b) Tensile Tests

Extruded Film, No Further Treatments, Gauge 17.9 g/m$^2$

| Test No. | Elongation at break (%) | Ultimate Tensile Strength | | Yield Tension | |
|---|---|---|---|---|---|
| | | N | Mpa | N | MPa |
| m.d. Test 1 | 392.00 | 34.00 | 71.58 | 12.00 | 25.26 |
| m.d. Test 2 | 199.49 | 19.00 | 40.00 | 11.00 | 23.16 |
| m.d. Test 3 | 371.01 | 33.00 | 69.47 | 12.20 | 25.68 |
| m.d. Test 4 | 340.00 | 27.00 | 56.84 | 11.50 | 24.21 |
| m.d. Test 5 | 364.00 | 32.00 | 67.37 | 12.50 | 26.32 |
| Average m.d. | 333.3 | 29.00 | 61.05 | 11.84 | 24.93 |
| t.d. Test 1 | 168.86 | 6.30 | 13.26 | 8.50 | 17.89 |
| t.d. Test 2 | 510.00 | 8.20 | 17.26 | 8.40 | 17.68 |
| t.d. Test 3 | 365.87 | 7.20 | 15.16 | 8.20 | 17.26 |
| t.d. Test 4 | 579.37 | 6.40 | 13.47 | 6.60 | 13.89 |
| t.d. Test 5 | 577.44 | 6.00 | 12.63 | 6.50 | 13.68 |
| Average t.d. | 440.31 | 6.82 | 14.36 | 7.64 | 16.08 |
| 45° Test 1 | 368.33 | 9.80 | 20.63 | 7.5 | 15.79 |
| 45° Test 2 | 330.55 | 6.90 | 14.53 | 4.3 | 9.05 |
| 45° Test 3 | 618.00 | 10.50 | 22.11 | 8 | 16.84 |
| 45° Test 4 | 414.30 | 9.40 | 19.79 | 6.2 | 13.05 |
| 45° Test 5 | 386.19 | 9.10 | 19.16 | 8 | 16.84 |
| Average 45° | 423.47 | 9.14 | 19.24 | 6.80 | 14.32 |

Example 1, Gauge 22 g/m$^2$

| Test No. | Elongation at break (%) | Ultimate Tensile Strength | | Yield Tension | |
|---|---|---|---|---|---|
| | | N | Mpa | N | MPa |
| m.d. Test 1 | 488.14 | 21.00 | 35.84 | 8.80 | 15.02 |
| m.d. Test 2 | 558.39 | 25.50 | 43.52 | 6.70 | 11.44 |
| m.d. Test 3 | 528.75 | 23.00 | 39.26 | 7.50 | 12.80 |
| m.d. Test 4 | 566.65 | 26.50 | 45.23 | 9.00 | 15.36 |
| m.d. Test 5 | 480.00 | 21.50 | 36.70 | 7.00 | 11.95 |
| Average m.d. | 524.39 | 23.50 | 40.11 | 7.80 | 13.31 |
| t.d. Test 1 | 127.23 | 23.50 | 40.11 | 23.50 | 40.11 |
| t.d. Test 2 | 109.01 | 24.50 | 41.82 | 24.50 | 41.82 |
| t.d. Test 3 | 116.70 | 23.00 | 39.26 | 23.00 | 39.26 |
| t.d. Test 4 | 120.15 | 25.50 | 43.52 | 25.50 | 43.52 |
| t.d. Test 5 | 199.37 | 19.20 | 32.77 | 22.00 | 37.55 |
| Average t.d. | 134.49 | 23.14 | 39.49 | 23.70 | 40.45 |
| 45° Test 1 | 156.71 | 17.50 | 29.87 | 13.2 | 22.53 |
| 45° Test 2 | 69.30 | 14.00 | 23.89 | 14 | 23.89 |
| 45° Test 3 | 137.54 | 20.00 | 34.14 | 16 | 27.31 |
| 45° Test 4 | 142.94 | 21.00 | 35.84 | 16.5 | 28.16 |
| 45° Test 5 | 122.20 | 18.50 | 31.58 | 15.3 | 26.11 |
| Average 45° | 125.74 | 18.2 | 31.06 | 15.00 | 25.60 |

Example 2, Gauge 19 g/m²

| Test No. | Elongation at Break (%) | Ultimate Tensile Strength N | Ultimate Tensile Strength Mpa | Yield Tension N | Yield Tension Mpa |
|---|---|---|---|---|---|
| m.d. Test 1 | 440.89 | 8.10 | 16.03 | 4.70 | 9.30 |
| m.d. Test 2 | 440.10 | 7.90 | 15.63 | 3.90 | 7.72 |
| m.d. Test 3 | 421.48 | 6.90 | 13.65 | 3.60 | 7.12 |
| m.d. Test 4 | 493.78 | 9.50 | 18.80 | 5.20 | 10.29 |
| m.d. Test 5 | 357.16 | 6.20 | 12.27 | 3.40 | 6.73 |
| Average m.d. | 430.68 | 7.72 | 15.28 | 4.16 | 8.23 |
| t.d. Test 1 | 133.00 | 7.10 | 14.05 | 12.40 | 24.54 |
| t.d. Test 2 | 226.29 | 10.00 | 19.79 | 14.50 | 28.69 |
| t.d. Test 3 | 176.00 | 10.50 | 20.78 | 12.20 | 24.14 |
| t.d. Test 4 | 168.55 | 11.10 | 21.97 | 12.00 | 23.75 |
| t.d. Test 5 | 188.04 | 12.10 | 23.95 | 14.40 | 28.50 |
| Average t.d. | 178.37 | 10.16 | 20.11 | 13.10 | 25.92 |
| 45° Test 1 | 91.00 | 16.50 | 32.65 | 16.5 | 32.65 |
| 45° Test 2 | 82.05 | 14.50 | 28.69 | 14.5 | 28.69 |
| 45° Test 3 | 71.79 | 12.20 | 24.14 | 12.2 | 24.14 |
| 45° Test 4 | 77.03 | 13.20 | 26.12 | 13.2 | 26.12 |
| 45° Test 5 | 85.55 | 15.00 | 29.68 | 15 | 29.68 |
| Average 45° | 81.48 | 14.28 | 28.26 | 14.28 | 28.26 |

EXAMPLE 3

There is used the same extruded films as in Example 1, and the same sequential m.d. stretching as in Example 2. Helical cutting is carried out under 30° to the original m.d. The film with 30° orientation is transversely stretched/embossed, in part as a single film, and in part cross webbed with itself between sharp-edged grooved rollers. The grooved rollers and the grooved roller process deviate from what is described in Example 1 only on the following points:

1) The grooves are made slightly deeper to allow a deeper intermeshing, and this is set at 1.2 mm.

2) One of the two grooved rollers with sharp-edged crests has a waved surface, exactly as shown in FIG. 9a. The intermeshing by 1.2 mm refers to the top sections of the waving.

3) The process is carried out at ambient temperature 25° C.

Figure 12:
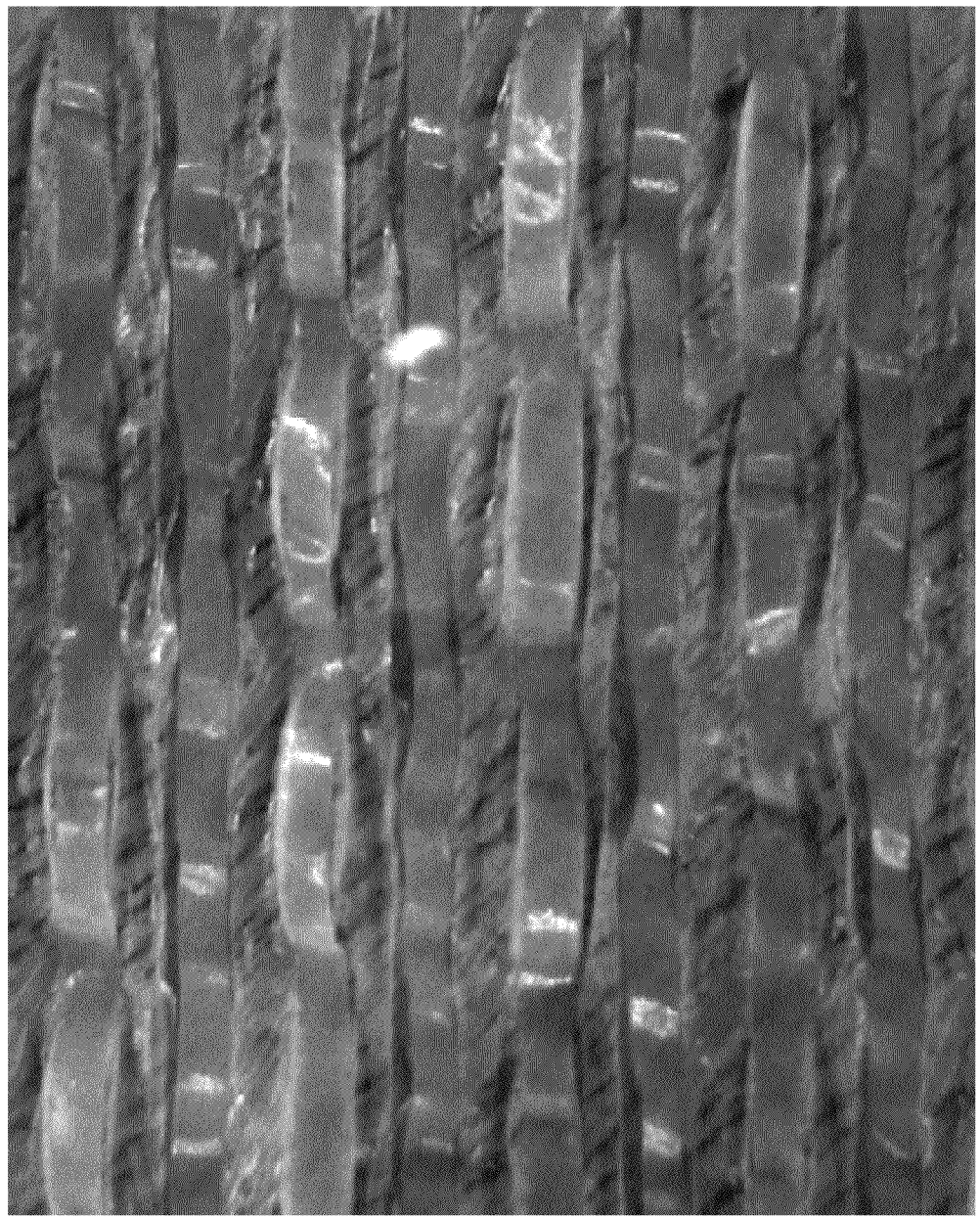

The produced single ply has gauge 9.5 g/m², and the produced crosslaminate is 19 g/m². A microphoto of the single ply film is shown as FIG. 12. The structure of the two products, when observed in microscope, looks generally similar to the structure shown in FIG. 1, but with the following differences:

1) The wavelength of the "ribbon-like regions" (A), which in FIG. 1 is about 0.6-1.2 mm and is irregular, now is even and corresponds to the wavelength of the roller shown in FIG. 9a, i.e. 2.5 mm.

2) The thinner "webs" (B) which in FIG. 1 are narrower than (A) now are slightly wider than (A), giving improved flexibility.

3) The "amplitude" of the waving, i.e. average vertical distance between each high region on one side and adjacent high regions on other side, now is about 0.5-0.6 mm, giving the film a particularly warm feel.

This high "amplitude" is remarkable, since the "amplitude" of the waving on one of the grooved, sharp-edged rollers is no more than 0.25 mm. It is a consequence of the variable degree of orientation within each region (A), produced by the gear roller stretching.

I claim:

1. A product comprising:
a film comprising a thermoplastic polymer material or an assembly of films, each film comprising a thermoplastic polymer material,
all of the films include:
an array of parallel band-shaped, linearly extending regions (A) and distinct linearly extending webs (B) integrally connecting the regions (A), each web (B) along its linear extension is thinner than adjacent portions of the regions (A), and
where the regions (A) and the webs (B) are oriented having at each location a dominating direction of orientation,
where each of the dominating directions of orientation of the regions (A) forms an angle (v) with a direction in which the regions (A) extend,
where the angle (v) has a value greater than 0° and less than or equal to 80°,
where the webs (B) includes arrays of linear furrows (C),
where the furrows (C) comprise necking-down zones or splits,
where each of the furrows (C) forms an angle (u) with the directions in which the regions (A) extend, and
where the angle (u) has a value greater than the value of the angle (v).

2. The product according to claim 1, wherein the angle (v) is greater than or equal to 10°.

3. The product according to claim 1 or 2, wherein the regions (A) are waved, each wave extending along the regions (A) and the webs (B) stabilize the waving.

4. The product according to claim 3, wherein the linear extending regions (A) include interrupting lines forming regions of interruptions (D) comprising webs thinner than the regions (A) similar in thickness to the webs (B) so that no distinct border exists between the web regions (B) and the regions of interruption (D), whereby each interrupted linear region (A) including its thinner regions of interruptions (D) is waved, the regions of interruption (D) comprise crests of the webs.

5. The product according to claim 1, wherein the dominating direction of orientation within each region (A) varies in a sequences not greater than 10 mm in length.

6. The product according to claim 1, wherein the product is an assembly of films comprising a crosslaminate, whereby the dominating directions of orientation of each film in the assembly and at each location of the laminate cross each other, the assembled films being joined in spots, lines or a combination thereof by bonding or blocking or both.

7. The product according to claim 6, wherein the regions (A) in different films of the crosslaminate cover each other along their full lengths, and the webs (B) cover each other along their full lengths.

8. The product according to claim 7, wherein the bonding or blocking is limited so that a major portion of each of the webs (B) are unbonded and unblocked.

9. The product according to claim 7, wherein the bonding or blocking is established through surface layers selected to aid the laminating to form the crosslaminate.

10. The product according to claim 7, wherein in the regions (A), an angle between dominating directions of orientation of any two laminated films is smaller than a sum of angles which each of these directions form with the direction in which the regions (A) extends.

11. The product according to claim 4, wherein the webs (B) and the regions of interruptions (D) are in through going micro-voided state, the fibrillation substantially following the local dominating direction of orientation, while the rest of the regions (A) have less or no through going micro-voids.

12. The product according to claim 1, wherein at least 50% of the film or each of the films in the assembly comprise high density polyethylene (HDPE) or isotactic or syndiotactic polyproplylene (PP).

13. The product according to claim 1, wherein a gauge of the film or of each the films in the assembly is less than or equal to 15 grams per square meter ($g/m^2$).

14. The product according to claim 1, wherein an average gauge of each web (B) is less than or equal to 70% of an average gauge of the two adjacent regions (A).

15. The product according to claim 7, wherein in all directions the elongation at break is no less than 100% and the ultimate tensile strength no less than 10 MPa, referring to tensile testing of 2.5 cm wide ribbons at a velocity corresponding to 500% elongation per minute.

16. The product according to claim 1, wherein a width of each region (A) is less than or equal to 2 mm.

17. The product according to claim 16, wherein a division of an array of regions (A) is less than or equal to 4 mm.

18. The product according to claim 1, wherein the product is continuous and the regions (A) extend substantially parallel to the continuous extension of the product.

19. The product according to claim 1, wherein the webs (B) are in through going micro-voided state, while the regions (A) have less or no through going micro-voids.

20. The product according to claim 6, wherein the webs (B) are in through going micro-voided state, while the regions (A) have less or no through going micro-voids.

21. The product according to claim 9, wherein the webs (B) are in through going micro-voided state, while the regions (A) have less or no through going micro-voids.

\* \* \* \* \*